United States Patent [19]
Hudson

[11] Patent Number: 5,368,313
[45] Date of Patent: Nov. 29, 1994

[54] BUSHING FOR TRAPPED BUSHING SEAL

[75] Inventor: James H. Hudson, Appleton, Wis.

[73] Assignee: A-C Compressor Corporation, Appleton, Wis.

[21] Appl. No.: 25,936

[22] Filed: Mar. 3, 1993

[51] Int. Cl.$^5$ .............................. F16J 15/44
[52] U.S. Cl. .................... 277/27; 277/173; 277/174
[58] Field of Search ............ 277/3, 27, 53, 54, 25, 277/173, 174

[56] References Cited

U.S. PATENT DOCUMENTS

| | | | |
|---|---|---|---|
| 3,575,424 | 4/1971 | Taschenberg | 277/27 |
| 3,724,861 | 4/1973 | Lesiecki | |
| 3,756,673 | 9/1973 | Strub | 277/75 X |
| 4,082,296 | 4/1978 | Stein | 277/3 |
| 4,199,152 | 4/1980 | Catterfeld | 277/173 X |
| 4,502,693 | 3/1985 | Lesiecki et al. | |
| 4,660,838 | 4/1987 | Katayama et al. | 277/174 X |
| 4,768,790 | 9/1988 | Netzel et al. | |
| 5,169,159 | 12/1992 | Pope et al. | 277/173 X |

Primary Examiner—Scott W. Cummings
Attorney, Agent, or Firm—Andrus, Sceales, Starke & Sawall

[57] ABSTRACT

An improved stepped bushing for a trapped bushing seal utilized in connection with compressors incorporates pressure dams on the interior circumference of the bushing. A plurality of pressure dams are located in both the inner bushing segment and the outer bushing segment to completely eliminate cross coupling and the resultant subsynchronous vibration.

10 Claims, 3 Drawing Sheets

BUSHING FOR TRAPPED BUSHING SEAL

BACKGROUND OF THE INVENTION

The present invention relates to a trapped bushing seal for a rotary member such as a centrifugal compressor. More particularly, the present invention relates to a bushing used in the trapped bushing seal.

Trapped bushing seals are typically used on horizontally-split, barrel-type centrifugal, single stage and axial compressors for installations requiring positive process gas sealing. These seals can be used in hydrocracking, catalytic reforming, refrigeration, or methanol, ethylene, ammonia synthesis as well as other gas compression processes. Compressors utilized in such installations may be operated at speeds from 1,500 to 16,000 rpm or greater.

The problem of providing a seal between a rotating shaft and a stationary housing, such as that found in a compressor, is extremely complex. A particularly difficult situation arises when the process fluid is a caustic or explosive gas. Since in this type of situation it is necessary to insure complete sealing of the gas, liquid seals such as trapped bushing seals utilizing stepped bushings are most frequently used. For ease of explanation, this description will refer to the process fluid as a gas and the sealing fluid as a liquid. However, it should be understood that the invention disclosed may be used in other applications so long as the sealing fluid has a greater density than the process fluid.

If the gas is to be sealed from the atmosphere, the pressure of the sealing liquid entering the seal must be at a greater pressure than the gas pressure. If the sealing liquid pressure is too high, an excessive amount of the liquid will flow toward the process gas where it may become contaminated, and an expensive separation procedure may be necessary to remove the gas from the sealing liquid or the liquid may have to be discarded. Therefore, attempts have been made to maintain the liquid pressure only slightly higher than the gas pressure so an excessive amount of the sealing liquid does not become contaminated by the gas. However, it has been found that if two small a pressure differential is maintained, gas becomes entrained in the sealing liquid during operation and will find its way to atmosphere. This entrainment is due to differential pressure patterns that are set up in liquid passages within the seal. These differential pressure patterns are caused by conventional Journal bearing action between the impeller and the stepped bushing. As the impeller rotates, it squeezes the sealing liquid against the bushing causing high and low pressure areas which vary in intensity depending on the eccentricity between the relative roundness of the impeller and the stepped bushing. These pressure areas may rotate or assume some relatively fixed position In the sealing passages. If the liquid pressure in these low pressure areas is below the gas pressure, the gas will enter the low pressure areas and find its way to atmosphere. In order to insure that the gas does not enter the low pressure areas, the sealing liquid pressure has to be sufficiently high so that the pressure of the liquid in the low pressure areas is greater than the pressure of the gas, but not so high that the sealing liquid flows toward the process gas.

It has been discovered that when the rotating impeller is running at relatively high rpm the bushing of the trapped bushing seal may develop "cross coupling" to destabilize the rotating element. It is believed this cross coupling is a result of the inability of the bushing to track the movement of the impeller and shaft thus resulting in a subsynchronous vibration. In the past, such vibrational problems were solved with larger clearances in the seal and multiple circumferential grooves in the bushing. However, both of these modifications to the bushing have drawbacks. For example, larger clearances in the seal result in undesirable higher flow of the sealing fluid, and the use of circumferential grooves reduces the load carrying ability of the bushing making it more susceptible to "rubs".

SUMMARY OF THE INVENTION

An improved stepped bushing for a trapped bushing seal utilizes pressure darns to center and stabilize the bushing. The principle of the pressure dam is to use an abrupt change in the circumferential velocity of the sealing fluid to generate a hydro dynamic force which acts radially at the edges of the dam. The radial force, which is added to the loading already existing on the bushing, drives the bushing more concentric with the rotor and thus minimizes or eliminates the "cross coupling" effects. It has been discovered that the addition of pressure dams to the inner bushing segment partially eliminates the subsynchronous vibration problem in that the onset of vibration appears at a higher speed of rotation and when vibration starts, the amplitude is limited in magnitude. However, the use of pressure dams on both the inner bushing segment and the outer bushing segment completely eliminates the problem of subsynchronous vibration.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
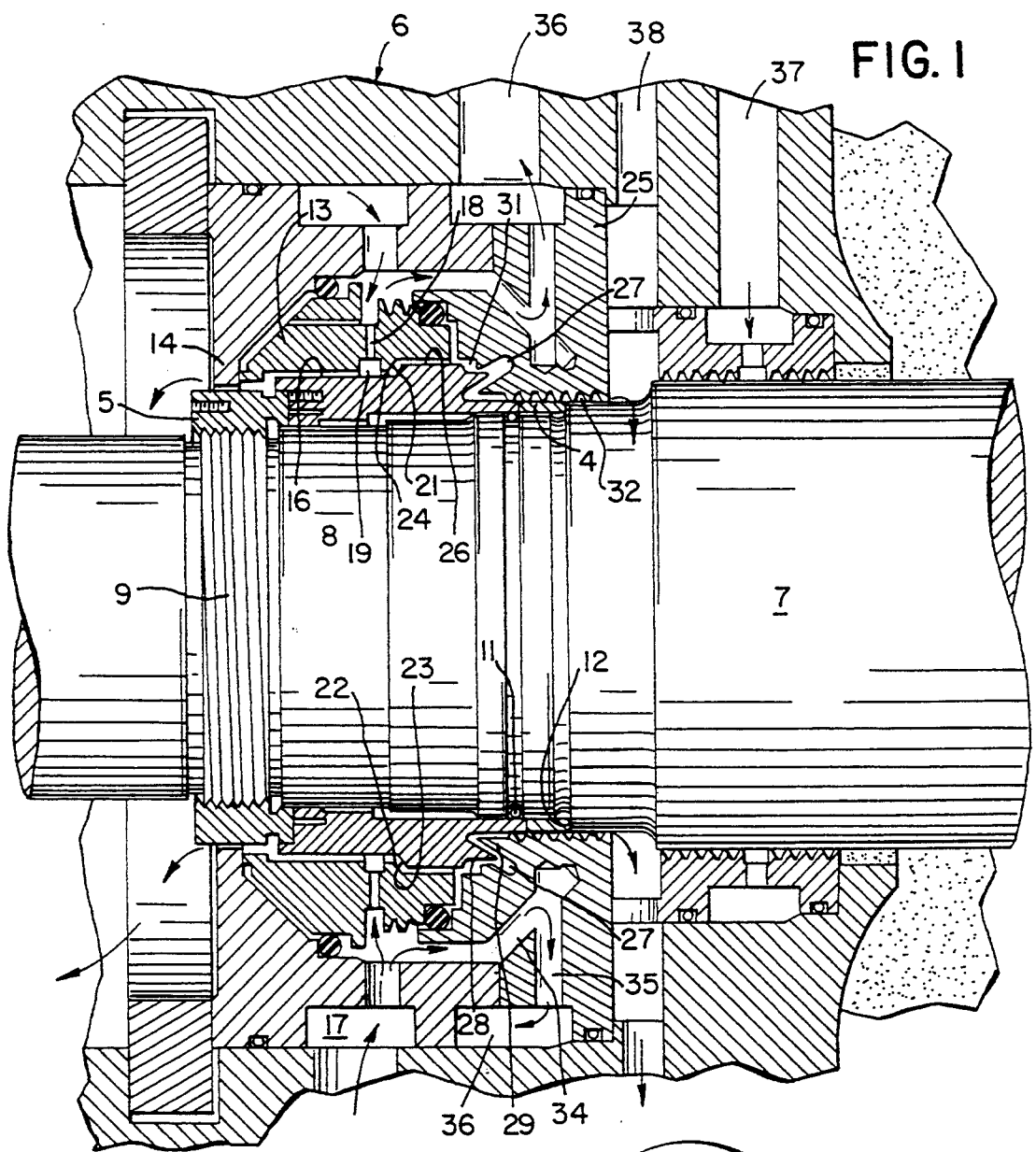
FIG. 1 is a fragmentary cross-sectional view of a compressor incorporating a trapped bushing seal having a bushing constructed in accordance with the principles of the present invention.
Figure 2:
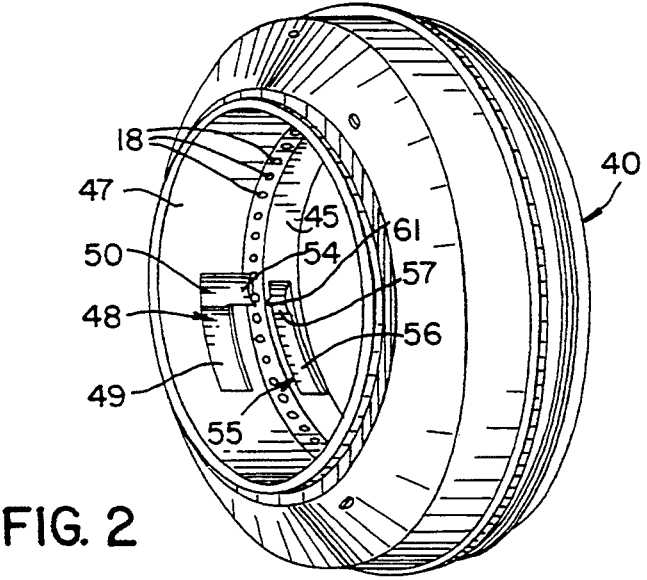
FIG. 2 is a perspective view of the bushing showing two of the pressure darns incorporated therein.

Referring to FIG. 1, a machine casing generally designated 6 has an opening therethrough in which is received a rotatable shaft 7. In this description, the left-hand end of machine casing 6 would be exposed to atmosphere and the right-hand end of machine casing 6 would be connected to the rest of the rotating machine containing pressurized gas to be sealed. A sleeve element or impeller 8 is rigidly connected to the shaft 7 in any conventional manner for rotation therewith. As herein shown for purposes of illustration, the shaft 7 is provided with a threaded portion 9 onto which a nut 5 is threaded to secure impeller 8. A conventional O-ring 11 may be provided between the shaft and the impeller 8 to insure a seal therebetween. A locating shoulder 12 may be provided on the shaft 7, and a spacer ring 4 may be employed to insure proper axial location of the impeller 8.

A stepped dual bushing 13 is positioned about the impeller 8 in radial clearance therewith of the magnitude commonly used in journal bearings. This stepped bushing 13 may be constructed as a separate element as shown herein so that it will float with the shaft 7 and impeller 8. The other end portion of the stepped bushing 13 is in intimate contact with an end wall 14 of the outer seal housing to provide secondary sealing of the sealing liquid from atmosphere. The impeller 8 and stepped bushing 13 define annular restricted fluid passages 16 and 26 which are open to the atmosphere and pressurized gas, respectively.

A sealing liquid inlet passage 17 is provided in the machine casing 6. The inlet passage 17 is in liquid communication with a passageway 18 through the stepped bushing 13. The passageway 18 communicates with an annular inlet chamber 19 located about the impeller 8 and defined by walls of the stepped bushing 13. The inlet chamber 19 is in liquid communication with one end of the restricted fluid passage 16.

An annular ridge 21 on an interior surface of the stepped bushing 13 forms one wall of the inlet chamber 19 and also one wall of a pumping chamber 22. This pumping chamber 22 is defined by the ridge 21 and the stepped bushing 13 and a shoulder 23 on the impeller 8. The interior annular edge of the ridge 21 defines an annular restricted port 24 connecting the inlet chamber 19 with the pumping chamber 22. Since this port 24 has a much smaller axial surface than the restricted fluid passages 16 or 26, it offers less resistance to liquid flow than the restricted fluid passages 16 or 26.

Annular restricted fluid passage 26 also serves as a transfer fluid passage. The transfer passage is at a greater radius than the port 24 and the restricted fluid passage 16 due to the shoulder 23 provided on the impeller 8. The transfer fluid passage 26 is in fluid communication with the pumping chamber 22 and with a radial tortuous passage generally designated 27. The transfer passage 26 restricts the leakage of sealing liquid toward the process gas during static conditions or partial speed operation. The radial passage 27 is defined by one end of the impeller 8 and a nonrotational portion of the seal housing or stator 25.

The tortuous passage 27 is composed of one or more radially spaced substantially axially disposed fingers 28 on the impeller 8. Complementary radially spaced annular substantially axially disposed fingers 29 are provided on the nonrotational stator 25. These interleaved fingers 28 and 29 define an annular swirl chamber 30. It should be understood that although one annular swirl chamber 30 is herein shown, two or more such chambers may be required on certain applications.

The radially outer end of the passage 27 is in fluid communication with the annular transfer passage 26 through a chamber 31. The radially inner end of the radial passage 27 is in fluid communication with what is shown herein as a labyrinth-type passageway 32. This labyrinth-type passageway is defined by the shaft 7 and the stator 25. The opposite end of the labyrinth-type passageway 32 is in fluid communication with the process gas side of the seal.

A pump (not shown) is provided to supply the pressurized sealing liquid to the inlet passage 17. Cooling passages generally designated 34 and 35 connect the inlet passage 17 with a discharge passage 36. This discharge passage 36 is in communication with a head tank (not shown) and also with the system sump (not shown). The head tank is in fluid communication with the process fluid by means of various conduits, and means may be provided to form a differential pressure control, or level control, to insure sufficient liquid level in the head tank, as is conventionally known and understood. Accordingly, it is believed that it is not necessary to describe in detail the system for supplying pressurized sealing liquid to the trapped bushing seal illustrated.

As is also well known, if the process gas is very corrosive, toxic, or is not expendable, the labyrinth type passageway 32 can be buffered with a gas that is compatible with the process gas. This prevents the diffusion of contaminating oil vapors into the process gas by supplying buffer gas through inlet 37 at a positive flow rate towards the process gas in excess of its diffusion rate. The buffer gas will flow towards the sealing fluid or oil by venting off through drain vent 38, and will thus prevent oil vapor diffusion into the process gas.

Referring now to FIGS. 2–5, bushing 13 is illustrated in more detail. As shown best in FIGS. 2 and 3, bushing 13 includes an annular body or member 40 defining a central shaft receiving opening 41, a radial interior circumference generally designated by 42 and a radial exterior circumference generally designated by 43. As shown best in FIG. 3, annular ridge 21 divides the interior circumference 42 of bushing member 40 into an axially extending inner bushing segment 44 having a first diameter which defines an annular inner wall 45, and an axially extending outer bushing segment 46 having a second diameter defining an annular outer wall 47. As illustrated, the diameter of inner segment 44 is greater than outer segment 46. As shown, there are a plurality of circumferentially spaced radial passageways 18 extending between the interior circumference 42 and the exterior circumference 43 of bushing 13. Preferably, these passageways 18 are equidistantly spaced from one another so as to uniformly distribute sealing fluid to inlet chamber 19 and fluid passageways 16 and 26. Passageways 18 are preferably located closely adjacent to ridge 21.

As a means for centering and stabilizing bushing 13, a plurality of pressure darns are formed in walls 45 and 47 of segments 44 and 46 respectively. There are preferably three pressure dams 48 formed in outer wall 47, and three pressure dams 55 formed in inner wall 45. Dams 48 and 55 are circumferentially spaced about walls 45 and 47, and are spaced equidistantly from each other, and in axial alignment.

Each dam 48 is identical in structure and therefore only one need be described herein. More particularly, each pressure dam 48 includes a first recess 49 formed in wall 47 which extends circumferentially and axially to take on a rectangular shape when viewed in plan. Each dam 48 also includes a second recess 50 formed in outer wall 47 that extends circumferentially and axially to also take on a rectangular shape when viewed in plan. Second recess 50 is in communication with recess 49, and as shown best in FIG. 4 defines a radius extending from the axis of rotation of shaft 7 which is greater than the radius defined by recess 49. In other words, recess 50 extends deeper into wall 47 than does recess 49 which is relatively shallow compared to recess 50. Recess 50 defines a pair of opposite axial side walls 51 and 52 and an arcuate outer wall 53. As shown best in FIG. 4, recess 49 extends circumferentially a distance greater than recess 50, and preferably extends circumferentially at least three times further than recess 50 extends circumferentially. Each recess 50 also includes a sealing fluid feed passage or chamber 54 formed in outer wall 47. Feed chamber 54 extends axially along outer wall 47 and communicates between recess 50 and radial passageways 18. Preferably, feed chamber 54 is an axial extension of recess 50. However, any means for communicating between recess 50 and passageways 18 may be utilized as long as sufficient sealing fluid is supplied to recesses 49 and 50.

Figure 3:
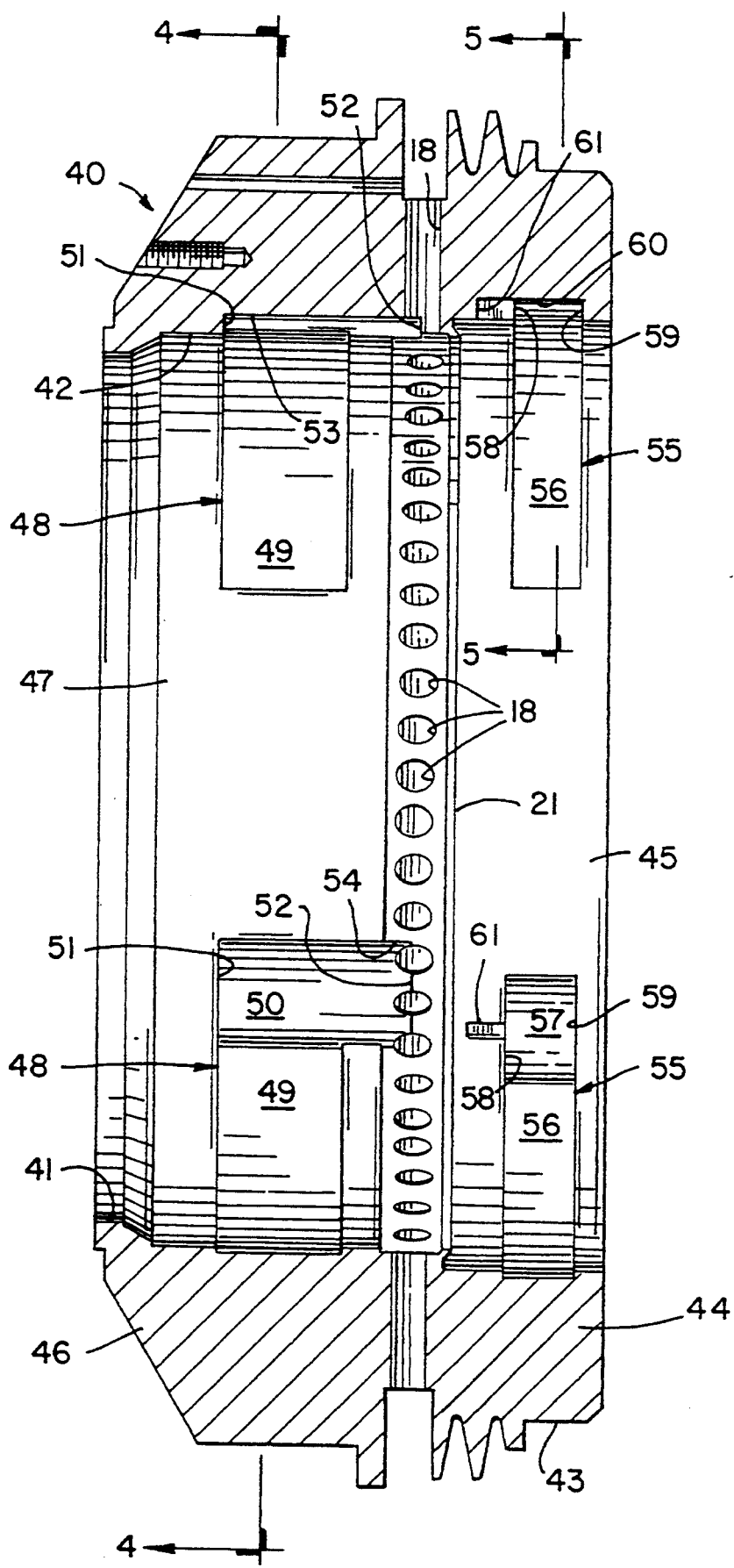
FIG. 3 is a cross-sectional view of the bushing of FIG. 2.
Figure 4:
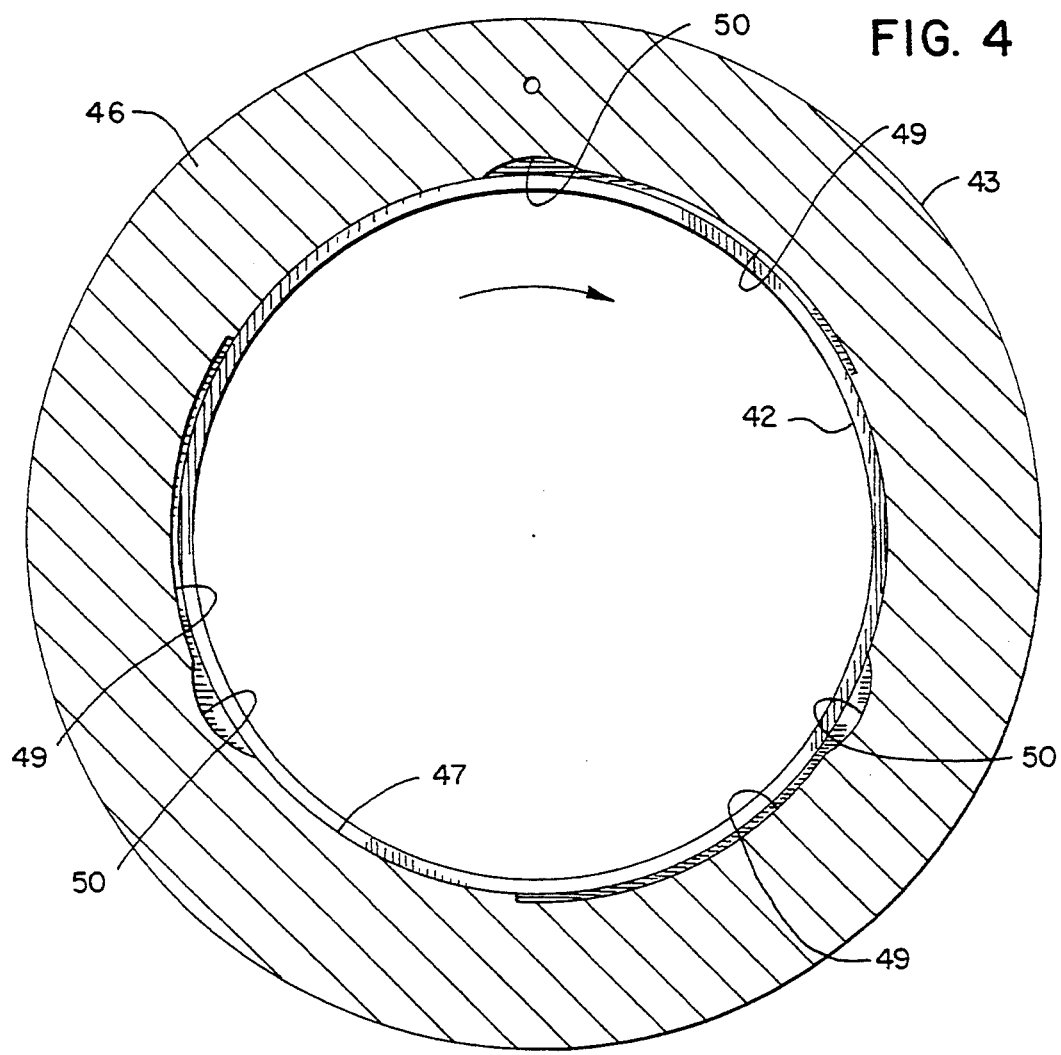
FIG. 4 is a cross-sectional view of the outer bushing segment taken along the plane of the line 4—4 in FIG. 3.
Figure 5:
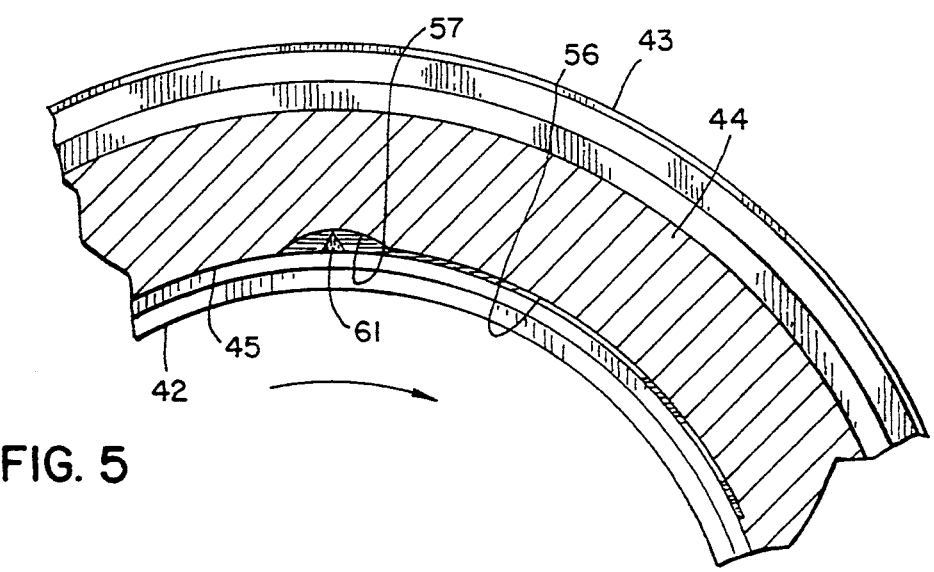
FIG. 5 is a cross-sectional view of a portion of the inner bushing segment taken along the plane of the line 5—5 in FIG. 3.

Referring now to FIGS. 3 and 5, there is illustrated the pressure dams 55 formed in inner wall 45 of bushing segment 44. Dams 55 are similar in configuration to dams 48, but as shown in FIG. 3 are slightly narrower in an axial direction. Thus, dams 55 each include a shallow recess 56 and a deeper recess 57. Recess 57 is in communication with recess 56 so as to allow flow of sealing fluid between recesses 56 and 57. As with dams 48, recess 56 extends circumferentially a distance greater than recess 57, and preferably extends circumferentially at least three times further than recess 57 extends circumferentially. Like recess 50 of dams 48, recess 57 of dams 55 define a pair of opposite axial side walls 58 and 59, and an arcuate outer wall 60. Dam 55 also includes a feed passage in the form of a notch 61 formed in inner wall 45 adjacent recess 57 and between recess 57 and ridge 21. Notch 61 extends axially along inner wall 45 and communicates at one end with recess 57. As shown best in FIG. 1, notch 61 allows for the flow of sealing fluid from pumping chamber 22 into dams 55.

In operation, sealing fluid will flow into dams 48 and 55 via passageway 18 to provide an abrupt change in the circumferential velocity of the sealing fluid. This abrupt change generates a hydro dynamic force which acts radially at the edges of the dams 48 and 55, which stabilizes bushing 13. Thus, the radial hydraulic force of the sealing fluid created at dams 48 and 55 results in centering of bushing 13 on shaft 7 which avoids "cross coupling" forces and eliminates any subsynchronous vibrations.

Various modes of carrying out the invention are contemplated as being within the scope of the following claims particularly pointing out and distinctly claiming the subject matter regarded as the invention.

I claim:

1. In a trapped bushing seal having a stationary housing surrounding a rotating shaft and sealing means disposed between said housing and shaft for sealing a high pressure fluid area from a low pressure fluid area, an improved stepped bushing comprising:

an annular bushing member defining a central shaft-receiving opening, a radial interior circumference and a radial exterior circumference;

said radial interior circumference including an annular ridge dividing said bushing member interior circumference into an axially extending inner bushing segment having a first diameter defining an annular inner wall and an axially extending outer bushing segment having a second diameter defining an annular outer wall;

at least one pressure dam formed in said annular inner wall; and at least one pressure dam formed in said annular outer wall.

2. The stepped bushing of claim 1 wherein there are a plurality of pressure dams circumferentially spaced about said annular inner wall and said annular outer wall.

3. The stepped bushing of claim 2 wherein said plurality of pressure dams are spaced equidistantly from each other.

4. The stepped bushing of claim 3 wherein there are three pressure dams formed in each of said inner and outer walls, and the dams in said inner wall are in axial alignment with the dams in said outer wall.

5. The stepped bushing of claim 1 wherein each pressure dam comprises first and second circumferentially and axially extending recesses, said first recess formed having a first radius, and said second recess formed in communication with said first recess and having a second radius greater than said first radius.

6. The stepped bushing of claim 5 wherein said first recess extends circumferentially a distance greater than said second recess.

7. The stepped bushing of claim 6 wherein said first recess extends circumferentially at least three times further than said second recess extends circumferentially.

8. The stepped bushing of claim 7 wherein said second recess defines a pair of opposite axial side walls and an arcuate bottom wall.

9. The stepped bushing of claim 5 wherein each pressure dam formed in said inner wall further includes a feed passage formed in said inner wall adjacent said second recess and between said second recess and said ridge, said feed passage extending axially along said inner wall and communicating with said second recess.

10. The stepped bushing of claim 5 wherein said outer bushing segment includes at least one passageway formed therethrough extending radially between said interior circumference and said exterior circumference, and said at least one pressure dam formed in said outer wall includes a feed chamber formed in said outer wall, said feed chamber extending axially along said outer wall and communicating between said second recess and said passageway.

* * * * *

UNITED STATES PATENT AND TRADEMARK OFFICE
CERTIFICATE OF CORRECTION

PATENT NO. : 5,368,313
DATED : November 29, 1994
INVENTOR(S) : James H. Hudson

It is certified that error appears in the above-indentified patent and that said Letters Patent is hereby corrected as shown below:

Claim 2, Col. 6, Line 13, delete "darns" and substitute therefor ---dams---; Claim 4, Col. 6, Line 20, delete "darns" and substitute therefore ---dams---; Claim 4, Col. 6, Line 22, delete "darns" and substitute therefor ---dams---.

Signed and Sealed this

Ninth Day of May, 1995

Attest:

BRUCE LEHMAN

*Attesting Officer*     *Commissioner of Patents and Trademarks*